Aug. 18, 1953 — H. T. DOW — 2,649,296
LEAF SPRING ASSEMBLY
Filed May 25, 1950
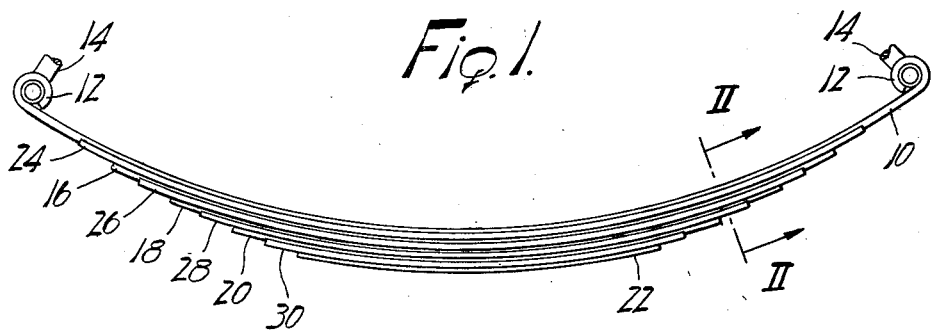
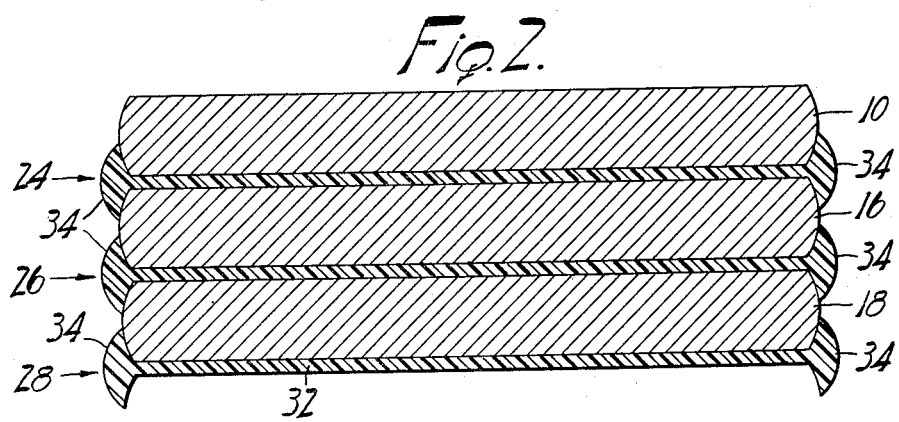
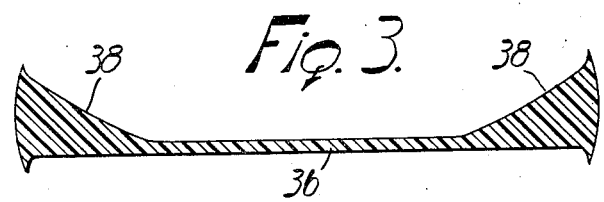
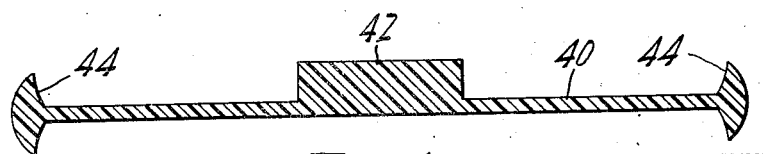
INVENTOR.
Harold T. Dow
BY
Bean, Brooks, Buckley & Bean
ATTORNEYS Patented Aug. 18, 1953

2,649,296

UNITED STATES PATENT OFFICE 2,649,296

LEAF SPRING ASSEMBLY

Harold T. Dow, Elma, N. Y.

Application May 25, 1950, Serial No. 164,230

2 Claims. (Cl. 267—49)

This invention relates to leaf spring assemblies for vehicles, and more particularly to those types of leaf spring assemblies as are presently used in automobiles or the like.

Whereas, it has heretofore been considered to be desirable to provide covers for such leaf spring assemblies to prevent road dirt and grit from entering between the leaves and provide "rebound clips" to maintain the leaves thereof in proper alignment, and to dispose lubricant reservoir devices between the leaves for eliminating squeaking of the springs; such devices of the prior art for the purposes aforesaid have been of only limited effectiveness and have been relatively expensive and otherwise disadvantageous.

It is an object of the present invention to provide in a leaf spring assembly a novel leaf separator device formed of strip-shaped stock material and adapted to function to eliminate spring noises while at the same time controlling the friction factor between adjacent leaves so as to obtain constant inherent spring damping action; to seal the side edges of the spring assembly against entrance of grit or dirt between the leaves; and to maintain the leaves in proper relative alignment under all operating conditions.

Another object of the invention is to provide in a leaf spring assembly a novel friction-reducing leaf separator which functions also to seal the side edges of the spring assembly against entrance of dirt or grit, thereby eliminating the need for an over-all wraparound cover or the like.

Another object of the invention is to provide a novel friction-reducing separator device for leaf spring assemblies which is so shaped as to hold itself in alignment with the spring leaves and which is adapted also to function to maintain the spring leaves in proper relative alignment, thereby eliminating the need of a conventional type rebound clip or the like.

Another object of the invention is to provide a leaf spring liner as aforesaid, the material of which is adapted to some degree of "cold flow" so as to adjust itself to dimensional irregularities of adjacent spring leaves so as to evenly distribute the pressures therebetween and avoid concentrated pressure and wear points.

Another object of the invention is to provide in a leaf spring assembly a leaf separator device which is formed of such material as to provide improved friction-reducing effects while being at the same time of improved wear resistance and durability.

Still another object of the invention is to provide in a leaf spring assembly an improved leaf separator device embodying the features and advantages aforesaid while being at the same time relatively inexpensive and easy to manufacture and install.

Other objects and advantages of the invention will appear from the specification hereinafter.

In the drawing:

Fig. 1 is a side elevation of a leaf spring assembly constructed in accordance with the invention;

Fig. 2 is a sectional view, on a larger scale, taken substantially along line II—II of Fig. 1;

Fig. 3 is a typical sectional view through a leaf separator of the invention, of modified sectional form to suit a modified sectional form of spring leaf; and Fig. 4 is a typical sectional view through another modified sectional form of leaf separator of the invention for use in connection with still another form of spring leaf.

The present invention contemplates disposition between adjacent spring leaves of a novel "liner" formed of a suitable tough yet lightweight non-metallic synthetic plastic material possessing the property of lubricantless friction-reducing operation; said material being of such strength and workability as to be adapted to be extruded into a "liner" of preferred sectional form comprising in combination a main leaf separator section with integral flanges extending along the opposite edges thereof shaped to complement the edge formations of adjacent spring leaves. Thus, the devices simultaneously seal the edge junctures of the spring leaves against ingress of highway grit and dirt, and at the same time function to hold the liners in aligned position between the leaves and maintain the spring leaves in proper positional alignment during flexing operations of the spring assembly. More specifically, the invention contemplates employment for the purposes aforesaid of a suitable synthetic plastic material such as for example a solid polyethylene type material; or for example, a synthetic linear condensation polyamide material such as is presently known in the trade as "Nylon," although the latter material is considerably more expensive than the first named material. In either case, such materials are of "waxy" feel and to some extent lubricantless, and are adapted to be cast into the required sectional form as will be explained more fully hereinafter by any suitable extrusion or compression molding or injection molding or casting method whereby the liner material may be economically produced in stock strip form and subsequently cut into suitable lengths to be fitted into position between adjacent spring leaves coextensive with the lengths thereof.

Thus, as illustrated in Fig. 1, a spring assembly of the present invention may be constructed to comprise a base spring leaf 10 having its ends rolled as indicated at 12 to receive the spring mounting shackles 14 by means of which the spring is attached to and supports the vehicle. The remainder of the spring assembly comprises a plurality of decreasing length leaves such as are indicated at 16, 18, 20, 22, respectively; as is customary in the art. It will of course be appreciated that the spring assembly may comprise any desired number of leaves other than the specific number shown in the drawing (Fig. 1). Also, it will be understood that the spring leaves may be of any desired sectional form, although in Figs. 1 and 2 of the drawing the spring leaves are illustrated to be of simple flat leaf form with somewhat rounded edges.

The leaf separators are illustrated in Figs. 1 and 2 as comprising strip-like elements 24, 26, 28, 30, each comprising a sheet-like main body portion 32 having formed integrally therewith along the opposite side edges thereof flanges 34 extending both above and below the general plane of the body portion 32. Furthermore, the flange portions 34 of the separator devices are shaped at their inboard surfaces so as to snugly fit and complement the side edges of the spring leaves; thereby providing effective seals against ingress between the spring leaves of dirt or grit from the roadway. Thus, it will be appreciated that the spring separator devices provide at the same time lubricantless friction-reducing slide bearing devices between adjacent spring leaves and edge sealing devices.

Fig. 3 illustrates another typical sectional form to which the leaf separator device of the invention may be shaped for use between spring leaves of the so-called "parabolic" section type; and in this case the liner stock material is simply extruded into the sectional form comprising a body part 36 and smaller flanges 38—38 as disposed above and below the liner, respectively. Similarly, Fig. 4 illustrates a typical sectional form for the liner stock material of the invention when designed for use in connection with the so-called "grooved" section type spring leaf which is used in some present day type spring assemblies. Thus, the section includes a body part 40 with a central ridge 42 and side flanges 44—44; and in any case it will be appreciated that the liner device of the invention will be fabricated to such sectional form as to complement the shape of the spring leaf to be used.

In addition to the friction-reducing and dirt-sealing functions of the liner device of the invention, the construction thereof provides means for maintaining the leaves of the spring assembly in positional alignment during flexing operation thereof. This is because of the fact that the edge flange portions of the liner device simultaneously engage the spring leaves above and below the liner, and thus the flexing of the spring assembly causes adjacent leaves of the assembly to relatively move longitudinally while being guided within the grooved faces of the liner device. The material from which the liner device is formed has been found to be non-brittle and of such strength and toughness and resistance to "cold flow" as to be adapted to operate permanently in this manner to properly guide the flexing spring leaves and to maintain them in longitudinal alignment; while at the same time the material of the liner is such as to permit it to "cold flow" slightly in the regions of dimensional irregularities of the spring leaves to thereby eliminate the possibility of concentrated pressure and wear points on the leaves. It is of course a particular feature and advantage that the liner of the invention may be easily and economically manufactured in strip form by simple extrusion or other processes as explained hereinabove, while forming the edge flange portions of the liner to be integral with the main body or web portion thereof. Or, as a possible alternative procedure, the liner stock material may be formed initially in simple flat web form dimensioned to extend at each edge beyond the sides of the spring assembly; and then heat-softened and ironed inwardly at the extending edge portions thereof against the spring assembly to provide the desired edge flange formations as referred to hereinabove. Thus, the device is easy and inexpensively fabricated to include the requisite spring noise eliminating web portion and the dirt sealing and guide side flanges in such manner that the latter are structurally integral with the web portion and therefore firmly anchored and thereby maintained against separation from the web. Furthermore, it is in the nature of the material of the liner device that although it permits relative movement of the liner and adjacent spring leaves during flexing of the spring assembly without the usual accompaniment of squeaks and other spring noises, it is not of slippery surface character but seems to provide a desirable degree of drag against relative movement of the adjacent leaves without being "sticky" or tacky. Thus, the liner of the invention possesses a still further advantage in that it provides a desirable damping of the spring action.

Although only a few forms of application of the invention to spring liner devices have been shown and described in detail, it will be apparent to those skilled in the art that the invention is not so limited but that various changes may be made therein without departing from the spirit of the invention or the scope of the appended claims.

I claim:

1. In a leaf spring assembly having multiple leaves with curved longitudinal edge portions, a liner inserted between adjacent leaves thereof comprising a strip of synthetic plastic pliable material selected from the class consisting of solid polyethylene and linear condensation polyamid possessing lubricantless friction-reducing properties having a sheet-like central web portion with flange portions formed integrally therewith at its opposite edges, the flange portions being sectionally shaped to snugly fit and complement the curved edge portions of the leaves throughout the entire lateral and longitudinal extents of the flange portions to dirt seal the curved edge portions of the springs.

2. A leaf spring assembly as set forth in claim 1 wherein the flange portions of the liner extend in both directions from the plane of the web portion to dirt seal the edges of the adjacent leaves of the spring and maintain the leaves in longitudinal alignment.

HAROLD T. DOW.

References Cited in the file of this patent

UNITED STATES PATENTS

| Number | Name | Date |
|---|---|---|
| 1,254,493 | Frood | Jan. 22, 1918 |
| 2,184,381 | Figgie et al. | Dec. 26, 1939 |
| 2,246,086 | Austin | June 17, 1941 |
| 2,246,092 | Gilman | June 17, 1941 |
| 2,299,873 | Beckel et al. | Oct. 27, 1942 |

FOREIGN PATENTS

| Number | Country | Date |
|---|---|---|
| 184,640 | Great Britain | Aug. 24, 1922 |
| 602,420 | Great Britain | May 26, 1948 |